United States Patent
Krco et al.

(10) Patent No.: US 8,548,518 B2
(45) Date of Patent: Oct. 1, 2013

(54) METHOD OF CONTROLLING USER EQUIPMENT IN WIRELESS TELECOMMUNICATIONS NETWORK

(75) Inventors: Srdjan Krco, Dublin (IE); Srdjan Kostic, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 12/993,690

(22) PCT Filed: May 20, 2008

(86) PCT No.: PCT/EP2008/056188
§ 371 (c)(1),
(2), (4) Date: Feb. 18, 2011

(87) PCT Pub. No.: WO2009/141001
PCT Pub. Date: Nov. 26, 2009

(65) Prior Publication Data
US 2011/0143808 A1    Jun. 16, 2011

(51) Int. Cl.
*H04M 1/00*    (2006.01)
(52) U.S. Cl.
USPC ......... 455/550.1; 455/436; 455/418; 701/202
(58) Field of Classification Search
USPC .................. 455/550.1, 436, 418; 701/202
See application file for complete search history.

(56) References Cited

U.S. PATENT DOCUMENTS

| 7,640,268 | B2 * | 12/2009 | Gotoh et al. | 701/532 |
|---|---|---|---|---|
| 2004/0203866 | A1 | 10/2004 | Sahinoglu et al. | |
| 2004/0249565 | A1 * | 12/2004 | Park | 701/200 |
| 2006/0149459 | A1 * | 7/2006 | Matsuura et al. | 701/201 |
| 2006/0271282 | A1 * | 11/2006 | Kuroda et al. | 701/208 |
| 2007/0287476 | A1 | 12/2007 | Jeong | |
| 2007/0291693 | A1 * | 12/2007 | Schultz et al. | 370/331 |
| 2008/0056212 | A1 | 3/2008 | Karaoguz et al. | |
| 2008/0102835 | A1 | 5/2008 | Zhao et al. | |
| 2008/0285494 | A1 * | 11/2008 | Shin | 370/311 |

OTHER PUBLICATIONS

International Search Report for PCT/EP2008/056188, mailed Mar. 12, 2009.
3GPP TS 25.331 V6.17.0 (Mar. 2008) 3rd Generation Partnership Project; Technical Specification Group Radio Access Network; Radio Resource Control (RRC); Protocol Specification (Release 6).
3GPP TS 36.331 V8.1.0, 3$^{rd}$ Generation Partnership Project; Technical Specification Group Radio Access Network; Evolved Universal Terrestrial Radio Access (E-UTRA) Radio Resource Control (RRC); Protocol Specification (Release 8) (Mar. 2008).

* cited by examiner

*Primary Examiner* — Danh Le
(74) *Attorney, Agent, or Firm* — Nixon & Vanderhye, P.C.

(57) ABSTRACT

The application discloses a method of controlling user equipment in a wireless telecommunications network in which a mobility characteristics of said user equipment is determined (102) and then recorded (106) in an assigned (104) information element. The information element is then transmitted (108) to a control node adapted to control at least part of the functions of the wireless telecommunications network and in return the user equipment receives (110) from said control node a control message that is optimised for mobility characteristics of said user equipment.

20 Claims, 5 Drawing Sheets

METHOD OF CONTROLLING USER EQUIPMENT IN WIRELESS TELECOMMUNICATIONS NETWORK

This application is the U.S. national phase of International Application No. PCT/EP2008/056188, filed 20 May 2008, which designated the U.S., the entire contents of which is hereby incorporated by reference.

TECHNICAL FIELD

The technology disclosed herein relates to wireless telecommunications networks, in general, and in particular to delivering system information to user equipment operating in a wireless telecommunications network.

BACKGROUND

User Equipment (UE) in today's wireless telecommunications networks are primarily used to access services that the network provides (voice calls, data access, etc.). However, the rapid introduction of non-human subscribers, i.e., machines, sensors, actuators, is changing the subscriber mix. Mobility patterns, traffic models and the manner in which the network is being used by this new group of subscribers are significantly different from behavior for of the standard group (i.e., human subscribers). Control messages sent by the network to the UE concern parameters involved in cell selection and reselection, measurement management, location and routing registration, handover, power controls, etc. The main disadvantage of this known solution is that all user equipment (UE) in one cell receive exactly the same information (i.e., system parameters), which means that the information received by the UE contains information that partially is not needed by the UE. With the different groups of UE, the one-size-fits-all approach is not suitable anymore.

In the existing solution there is no mechanism in Radio Access Network to differentiate between different groups or types of UE relating to UE mobility-application aspect (or mobility capability). All UE are handled with similar set of functionalities and consequently, using similar set of algorithms. This one-size-fits-all approach is designed for standard mobile subscriber, i.e., a human subscriber carrying a mobile device as they roam and using it to access network services.

SUMMARY

The technology disclosed herein seeks to provide improved user equipment, control node, wireless telecommunications network and a method of controlling said user equipment.

According to a first aspect of the technology disclosed herein there is provided a method of controlling user equipment in a wireless telecommunications network, wherein the control depends on radio access capability of said user equipment. The method comprises determining by said user equipment mobility characteristics of said user equipment. The method also comprises a step of assigning at least part of an information element for reporting mobility characteristics of said user equipment and a step of recording in said information element said determined mobility characteristics. Once the mobility characteristic is recorded in the information element said information element is transmitted to a control node adapted to control at least part of the functions of the wireless telecommunications network. Finally, the user equipment receives from said control node a control message that is optimized for mobility characteristics of said user equipment.

According to a second aspect of the technology disclosed herein there is provided user equipment for a wireless telecommunications network comprising a transmitter section and a receiver section. The user equipment also comprises a control unit adapted to determine mobility characteristics of said user equipment. Said transmitter section is adapted to transmit to a control node of the wireless telecommunications network an information element comprising said determined mobility characteristics and said receiver section is adapted to receive from said control node a control message optimized for mobility characteristics of said user equipment.

According to a third aspect of the technology disclosed herein there is provided a control node adapted to control at least part of the functions of the wireless telecommunications network. The control node comprises a first interface for receiving information element with mobility characteristics of user equipment operating in said telecommunications network. The control node also comprises a processing section adapted to generate a control message optimized for mobility characteristics of said user equipment received in said information element. The control node further comprises a second interface for transmitting said control message optimized for mobility characteristics of said user equipment.

According to a fourth aspect of the technology disclosed herein there is provided a wireless telecommunications network comprising at least one base station, user equipment and at least one control node. The control node is adapted to control at least part of the functions of the wireless telecommunications network. A base station comprises a receiver section adapted to receive from said user equipment an information element comprising mobility characteristics of said user equipment. The base station also comprises an interface adapted to forward said information element to said control node. Said control node comprises a processing section adapted to generate control messages optimized for mobility characteristics of said user equipment. The control messages are generated based on said mobility characteristics received in said information element from said base station.

The technology disclosed herein provides the benefit of informing Radio Access Network (RAN) about the existence of UE that is static (e.g., sensor network gateways in the mobile network). Using the new UE capability group the radio access network may optimize its functionalities, with reduced control plane signaling towards UE and radio base stations. Adding said new UE capability group creates a possibility to differentiate UE relating to mobility aspect and consequently, to utilize the way in which the UE are being used in order to obtain optimized network service and to use the network more efficiently.

BRIEF DESCRIPTION OF THE DRAWINGS

The technology disclosed herein will be understood and appreciated more fully from the following detailed description taken in conjunction with the drawings in which.

DETAILED DESCRIPTION

In order to optimize the number of control messages and the contents of the control messages the technology disclosed herein in its embodiments introduces a method of controlling user equipment operating in a wireless telecommunications network that uses reporting mobility characteristics of individual user equipment. While human subscribers are moving most of the time, mobility of machines is dependant on the actual application they are used in and in many cases they are static throughout their lifetime (e.g., existing machine-to-machine communication used for monitoring of vending machines). In addition, for some services it is important to know if the UE is located on a high speed train or a car as it impacts RAN performance and utilization, establishment of Signalling Radio Bearers (SRBs) on High-Speed Downlink Shared Channel (HS-DSCH) as part of fast call setup.

The description of embodiments of the technology disclosed herein is mainly based on examples that are related to 3G ($3^{rd}$ generation) wireless telecommunications network (WCDMA network is considered as RAN). However, this is just one example of possible embodiments of the technology disclosed herein and it is within contemplation of the technology disclosed herein that that it is also applicable to other types and generations of wireless telecommunications networks (e.g., LTE—Long Term Evolution).

Figure 1:
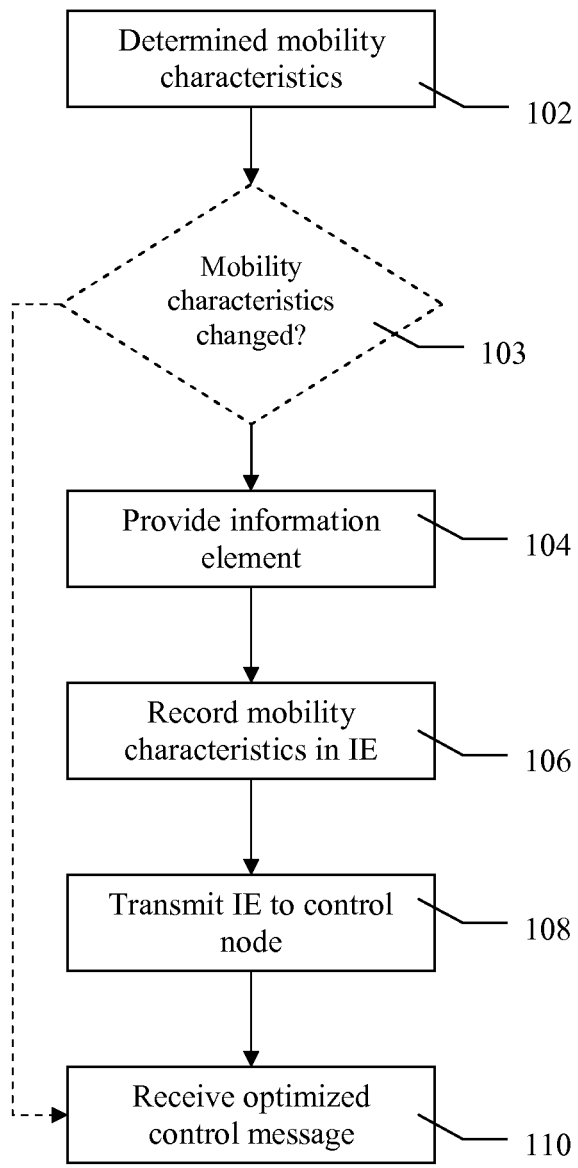
FIG. 1 is a diagram illustrating a method of controlling user equipment in a wireless telecommunications network in one embodiment of the technology disclosed herein.

FIG. 1 illustrates an embodiment of the technology disclosed herein. In this embodiment first the user equipment (UE) determines 102 its mobility characteristics. In order to determine its mobility characteristics the UE uses an acceleration sensor or a GPS receiver. In the case of acceleration sensor the information read from the sensor is somewhat limited as this allows determining only if the UE is static or moving, but is sufficient to allow for classifying the UE to one of these two main groups. Using readings from a GPS receiver, or to be more precise from a processor running an application for processing GPS data, allows for more precise mobility characteristics that includes additionally the speed of travel, direction of travel and other information that also could be used by the wireless telecommunications network (e.g., a destination programmed in the GPS application).

Once the mobility characteristics is determined at least part of an information element that is to be sent from the UE to the telecommunications network is assigned 104 for reporting this determined mobility characteristics to the telecommunications network. In this way a sub-information element for reporting mobility characteristics is created in the information element to be sent from UE to the telecommunications network, which in one embodiment can be User Equipment Radio Access Capability Information Element as defined in 3GPP TS 25.331. It is just one of many possible implementations of the information element and the reference to 3GPP document should not be understood as limiting the technology disclosed herein to 3G telecommunications networks.

In the next step the determined mobility characteristics is recorded 106 in said information element and then the information element is transmitted 108 to a control node of the telecommunications network. The control node is adapted to control at least part of the functions of the wireless telecommunications network and in a preferred embodiment it is a Radio Network Controller (RNC). In alternative embodiments the control node may not be the RNC, but for example a node running OSS or even a base station (when the network management is distributed rather that centralised).

Finally, in return, the UE receives 110 from said RNC a control message optimized for mobility characteristics of said user equipment. The optimized control message includes information selected based on the determined mobility characteristics of said user equipment and as a result it will not include information that is of no use for this particular UE from with regards to its mobility characteristics. This means that if the UE is a static communication module installed in a vending machine it will not receive, for example, information related to handover.

Figure 3:
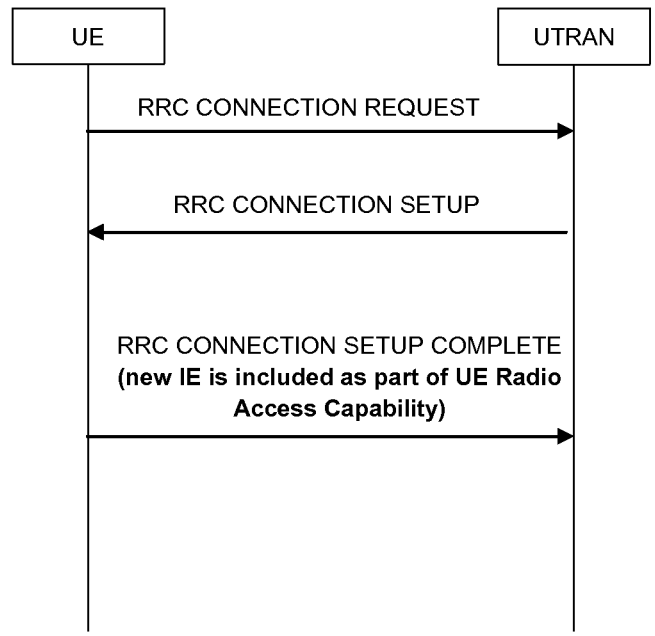
FIG. 3 is a message sequence chart illustrating a method of controlling user equipment in a wireless telecommunications network in one embodiment of the technology disclosed herein.

In a particular embodiment of 3G networks this new information element (IE) indicates to UMTS Terrestrial Radio Access Network (UTRAN) to which group the corresponding UE belongs based on mobility-application characteristics. UMTS stands for Universal Mobile Telecommunications System. At least two values are defined to designate the at least two different groups of UE: static and mobile. Each UE will determine its mobility based on the available local information (for example, using built in acceleration sensors and/or GPS information) or even as a built-in characteristic of an UE (e.g., for some stationary servers or static/semi-static monitoring equipment). Based on the determined or pre-defined mobility characteristics, each UE will send this capability IE to UTRAN during a RRC connection setup as the indicator of the UE group. This RRC connection is illustrated in FIG. 3. The IE indicating mobility characteristics is an optional IE which means that if the mobility characteristics can be determined by the UE it will be sent to UTRAN as part of the UE Radio Access Capability IE. Otherwise, if this IE related to mobility characteristics is not present the telecommunications network will treat the corresponding UE as a standard mobile user with the full mobility scope (from static to highly-mobile user).

FIG. 1 shows also step 103 in which it is checked if the mobility characteristics of the UE has changed since the previous determination. This step is to reduce the amount of information transmitted between the UE and the network. If the mobility characteristics hasn't changed it is not necessary to report the results of said determination because this characteristics is already known by the control node and would not affect the control messages received 110 by the UE from the control node. This step, however, is optional and therefore marked in the drawing with a dashed line.

Figure 2:
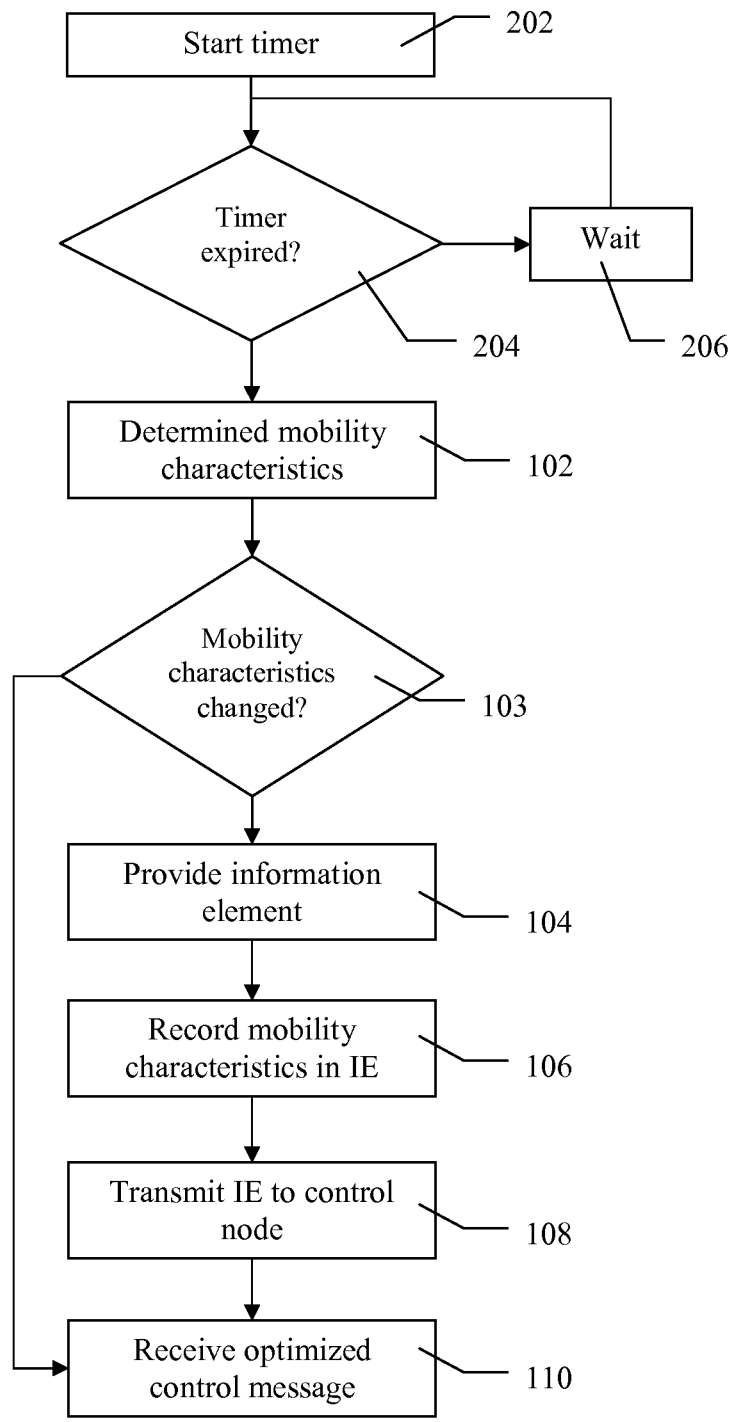
FIG. 2 is a diagram illustrating method of controlling user equipment in a wireless telecommunications network in one embodiment of the technology disclosed herein.

The step of determining the mobility characteristics may be initiated periodically as illustrated in FIG. 2. FIG. 2 shows one embodiment of the technology disclosed herein, where timer is started 202 and the step of determination 102 is only initiated if it is confirmed that the timer expired 204. Otherwise the UE is ordered to wait 206 until the timer expires.

Figure 4:
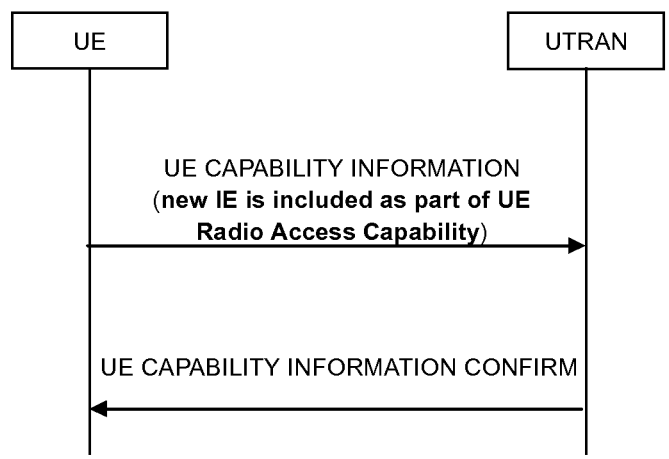
FIG. 4 is a message sequence chart illustrating a method of controlling user equipment in a wireless telecommunications network in one embodiment of the technology disclosed herein.

In alternative embodiments the step of determining the mobility characteristics can be triggered by events. Examples of the events include handover procedure, connection establishment or it can be triggered by a request from the wireless telecommunications network. In the case of 3G network the example events are:

- handover to UTRAN from other radio access technologies;
- handover from UTRAN to other radio access technologies;
- handover to UTRAN when capabilities information is sent from one to another node;
- CN (Core Network) hard handover within the same radio access technologies;
- RRC (Radio Resource Control) connection establishment in WCDMA (Wideband Code Division Multiple Access) RAN as shown in FIG. 3 illustrating an example of sending the IE with mobility characteristics during a RRC connection establishment before the end user can make a service call or use some other mobile functions (e.g. a location area/routing area registration to Core Network or mobility functions);
- when it is requested by UTRAN or when UE wants to convey UE specific capability information to the UTRAN as illustrated in FIG. 4.

In the cases when the mobility characteristics is changed during the existing radio connection, the UE informs UTRAN about the UE capability changes compared with previous one stored in UE.

Figure 5:
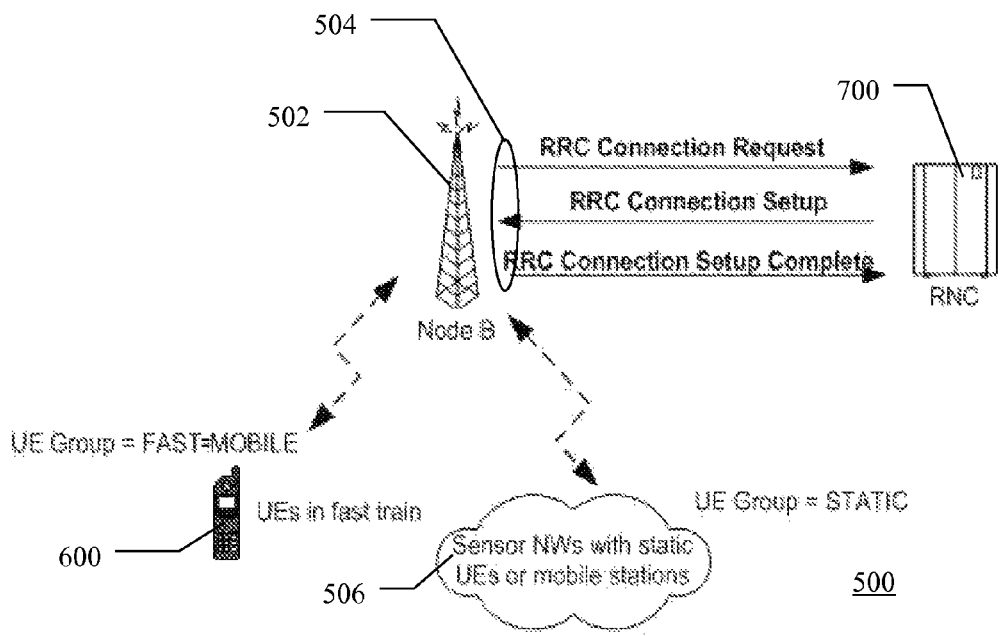
FIG. 5 is a diagram illustrating a wireless telecommunications network in one embodiment of the technology disclosed herein

FIG. 5 presents a wireless telecommunications network 500 in one embodiment of the technology disclosed herein. The network 500 comprises a plurality of base stations of which for simplicity only one 502 is illustrated. The network also comprises at least one Radio Network Controller (RNC) 700 which is adapted to control at least part of the functions of the wireless telecommunications network 800 and further the network comprises user equipment 600. In FIG. 5 only a mobile phone is illustrated as a UE 600, but there is also a cloud 506 that symbolises a sensor networks of static or mobile UE not used by human subscribers. The base station 502 comprises a receiver section that receives from said user equipment 600 an information element comprising mobility characteristics of said user equipment 600. It also comprises an interface 504 adapted to transmit said information element to said RNC 700. In various embodiment different types of interfaces 504 can be used. The base stations can be connected to the remaining parts of the network for example via radio link or wireline connection (copper or fibre cable). Said RNC 700 comprises a processing section which generates control messages optimized for mobility characteristics of said user equipment 600 received in said information element from said base station 502 by including information that is selected based on said mobility characteristics.

In alternative embodiments at least some functions of the RNC can be taken over by a node running OSS or even a base station (when the network management is distributed rather than centralised). In these embodiments the control messages optimized for mobility characteristics of said user equipment 600 are generated by the base stations or by the OSS node.

Figure 6:
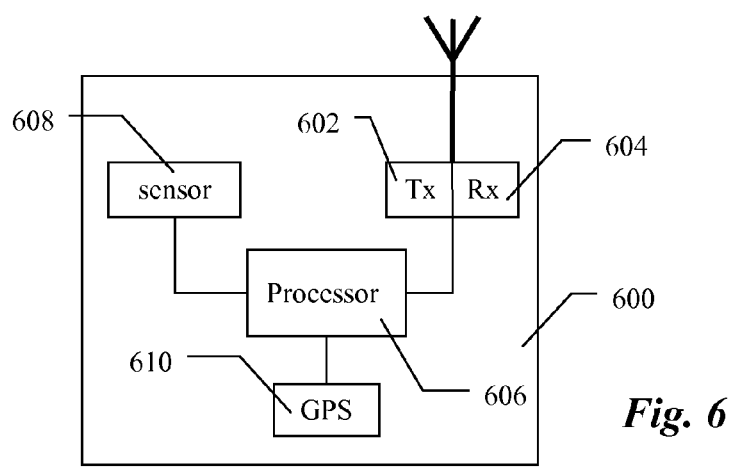
FIG. 6 is a diagram illustrating User Equipment in one embodiment of the technology disclosed herein.

FIG. 6 illustrates a user equipment 600 in one embodiment of the technology disclosed herein. The UE is for use in a wireless telecommunications network 500. For the sake of clarity the drawings in this application present the technology disclosed herein in a schematic way with elements and lines not essential for understanding the technology disclosed herein omitted. The UE may be in one embodiment a mobile phone with all the elements and features of a mobile phone and in another embodiment the UE may be a communication module of a vending machine, which has different functionalities to a mobile phone because its function is also different. The UE 600 comprises a transmitter section 602 and a receiver section 604 connected to an antenna and via air interface to the wireless telecommunications network. It further comprises a control unit 606 that determines mobility characteristics of said user equipment 600. In one embodiment the control unit 606 can be a CPU (Central Processing Unit) and in alternative embodiments the control unit can be implemented as a combination of CPU and peripherals and other processing units. The mobility characteristics can be determined by reading indication of an acceleration sensor 608 or a GPS unit 610. The transmitter section 602 transmits to a control node an information element comprising said determined mobility characteristics, whereas the receiver section 604 receives from said control node a control message for mobility characteristics of said user equipment.

In one embodiment the UE 600 comprises the acceleration sensor 608. In an alternative embodiment the UE comprises the GPS unit 610. In yet another embodiment the UE 600 comprises both the acceleration sensor 608 and the GPS unit 610 which has the benefit of being capable of determining mobility characteristics of said UE 600 even when the GPS unit 610 is powered down or inactivated in any other way. In battery powered mobile phones power consumption is a critical issue and it is quite common that sections of the mobile phone that are not necessary for the operation of the mobile phone are powered down to save the battery. In this embodiment the mobility characteristics is determined using the acceleration sensor 608 when the GPS unit is not operational and using said GPS unit 610 when it is operational. Additionally, when the GPS unit 610 is switched on the UE 600 determines its mobility characteristics in order to update the characteristics determined earlier using the acceleration sensor (by adding information on speed of travel and destination if known).

In general, the UE groups are defined based on their mobility characteristics. In one embodiment two basic values are proposed for the mobility characteristics information element 'UE group', i.e., static and mobile. However, in alternative embodiments the value of the mobility characteristics information element 'UE group' can have more values, e.g., static, low-speed mobility, high-speed mobility, etc. Moreover, the UE group IE might be also based on the UE function (or purpose), e.g., data only, TV only, sensor-based monitoring equipment, multimedia center, etc.

Figure 7:
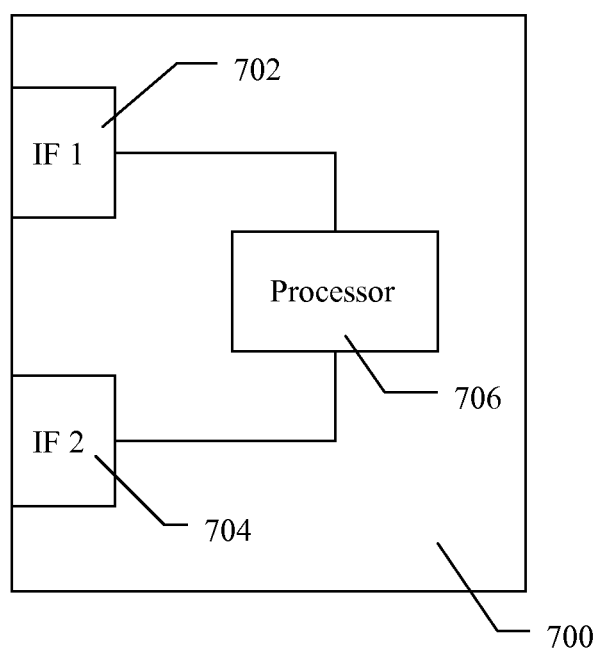
FIG. 7 is a diagram illustrating a control node in one embodiment of the technology disclosed herein.

In FIG. 7 a control node 700 in accordance with one embodiment of the technology disclosed herein is depicted. In one embodiment the function of the control node 700 is performed by a Radio Network Controller. The RNC 700 controls at least part of the functions of the wireless telecommunications network. The RNC 700 comprises a first interface 702 for receiving an information element comprising mobility characteristics of user equipment operating in said telecommunications network and a second interface 704. Preferably the first and second interfaces are integrated. It also comprises a processing section, e.g., a CPU, 706 which generates a control message optimized for mobility characteristics of said user equipment. In alternative embodiments the processing section 706 can be a CPU and additional hardware and software components. The control message is optimized such that it comprises information that is suitable for UE of a certain mobility characteristics and does not contain information that is not needed for UE with such mobility characteristics (e.g., no handover information for static user equipment).

Using the new UE capability group the radio access network may optimize its functionalities, with reduced control plane signalling towards UE and radio base stations (RBS). For example, no measurement control messages have to be sent to UE related to event 1x used for soft handover handling, where event 1x represents different reporting criteria for event-based measurements requested from UE. These measurements are done by UE, at the same frequency as connection carrier. Event 1x is short term for events as 1*a*, 1*b*, 1*c*, 1*d*, 1*e*, if etc as defined in TS 25.331. It is not necessary that RBS carries out measurements that are initiated for power balancing between different RBS because static UE group is connected to only one RBS and these measurements are not necessary for static UE. Using new UE capability group RAN can be used to optimize its RRM (Radio Resource Management) algorithms or connection quality handling (e.g., algorithm specific for static users)

The invention claimed is:

1. A method of controlling user equipment in a wireless telecommunications network comprising;
   a) determining by said user equipment a mobility characteristics of said user equipment, wherein the mobility characteristics specify whether the user equipment is stationary or mobile;
   b) assigning at least part of an information element for reporting mobility characteristics of said user equipment;
   c) recording in said information element said determined mobility characteristics;
   d) transmitting said information element to a control node adapted to control at least part of the functions of the wireless telecommunications network;
   e) receiving from said control node a control message optimized for mobility characteristics of said user equipment.

2. The method according to claim 1, wherein said optimized control message comprises information selected on the basis of the determined mobility characteristics.

3. The method according to claim 1, wherein said determination is carried out periodically.

4. The method according to claim 1, wherein the acts of assigning, recording and transmitting are carried out if it is determined that the mobility characteristics of the user equipment has changed.

5. The method according to claim 1, wherein acts a-d are carried out in the case of handover procedure.

6. The method according to claim 1, wherein acts a-d are carried out in the case of connection establishment.

7. The method according to claim 1, wherein acts a-d are carried out as a result of request from the wireless telecommunications network.

8. The method according to claim 1, wherein the mobility characteristics information element is transmitted as part of user equipment capability information element.

9. The method according to claim 1, wherein the user equipment also records in said information element a function of the user equipment in said wireless telecommunications network.

10. The user equipment adapted to operate in accordance with the method of claim 1.

11. A user equipment for a wireless telecommunications network comprising:
   a transmitter section;
   a receiver section;
   a control unit adapted to determine mobility characteristics of said user equipment, wherein the mobility characteristics specify whether the user equipment is stationary or mobile;
   said transmitter section being adapted to transmit to a control node an information element comprising said determined mobility characteristics;
   said receiver section being adapted to receive from said control node a control message optimized for mobility characteristics of said user equipment.

12. The user equipment according to claim 11, further comprising an acceleration sensor; and wherein the control unit is adapted to read the indications from said sensor and to update the mobility characteristics based on said reading.

13. The user equipment according to claim 11, further comprising a Global Positioning System unit; and wherein the control unit is adapted to read indications from said Global Positioning System unit and to update the mobility characteristics based on said reading.

14. The user equipment according to claim 13, wherein the Global Positioning System unit is adapted to determine speed of travel of the user equipment and the control unit is adapted to include the speed of travel in the mobility characteristics.

15. A control node adapted to control at least part of the functions of the wireless telecommunications network, the control node comprising:
   a first interface configured to receive an information element comprising mobility characteristics of user equipment operating in said telecommunications network, wherein the mobility characteristics specify whether the user equipment is stationary or mobile;
   a processing section adapted to generate a control message optimized for mobility characteristics of said user equipment received in said information element; and
   a second interface configured to transmit said control message optimized for mobility characteristics of said user equipment.

16. The control node according to claim 15, wherein said processing section is adapted to optimize said control message such that said control message comprises information selected on the basis of the mobility characteristics received in said information element.

17. The control node according to claim 15, wherein said first interface and said second interface are integrated.

18. A wireless telecommunications network comprising:
   at least one base station;
   at least one control node adapted to control at least part of the functions of the wireless telecommunications network; and
   a user equipment;
   wherein the base station comprises:
      a receiver section adapted to receive from said user equipment an information element comprising mobility characteristics of said user equipment, wherein the mobility characteristics specify whether the user equipment is stationary or mobile; and
      an interface adapted to forward said information element to said control node;
   wherein said control node comprises a processing section adapted to generate control messages optimized for mobility characteristics of said user equipment received in said information element from said base station.

19. The wireless telecommunications network according to claim 18, wherein said processing section of said control node is adapted to optimize said control message such that said control message comprises information selected on the basis of the mobility characteristics received in said information element.

20. The wireless telecommunications network according to claim 18, wherein the control node comprises a Radio Network Controller.

* * * * *

UNITED STATES PATENT AND TRADEMARK OFFICE
CERTIFICATE OF CORRECTION

PATENT NO. : 8,548,518 B2
APPLICATION NO. : 12/993690
DATED : October 1, 2013
INVENTOR(S) : Krco et al.

It is certified that error appears in the above-identified patent and that said Letters Patent is hereby corrected as shown below:

In the Specification

In Column 3, Line 11, delete "herein" and insert -- herein; --, therefor.

In Column 3, Line 15, delete "herein;" and insert -- herein. --, therefor.

In Column 3, Line 31, delete "utilization," and insert -- utilization, e.g., --, therefor.

In Column 5, Line 16, delete "(e.g. a" and insert -- (e.g., a --, therefor.

In Column 6, Line 12, delete "message" and insert -- message optimized --, therefor.

In Column 7, Line 12, delete "users)" and insert -- users). --, therefor.

In the Claims

In Column 7, Line 15, in Claim 1, delete "comprising;" and insert -- comprising: --, therefor.

Signed and Sealed this
Twenty-second Day of July, 2014

Michelle K. Lee
*Deputy Director of the United States Patent and Trademark Office*